United States Patent

Breer et al.

[15] 3,638,915
[45] Feb. 1, 1972

[54] APPARATUS FOR INTRODUCING SUBSTANCES INTO A FOAMABLE MIXTURE FOR FORMING A FOAM MATERIAL

[72] Inventors: Karl Breer, Cologne; Udo Lauterbach, Leverkusen, both of Germany

[73] Assignee: Farbenfabriken Bayer Aktiengesellschaft, Leverkusen, Germany

[22] Filed: Apr. 15, 1970

[21] Appl. No.: 28,700

[30] Foreign Application Priority Data

Apr. 26, 1969 Germany ..................P 19 21 387.7

[52] U.S. Cl. ..................................................................259/4
[51] Int. Cl. ....................................................................B01f 15/02
[58] Field of Search ..................259/4, 18, 36, 60, 164, 165; 260/12.5; 23/252

[56] References Cited

UNITED STATES PATENTS

| 3,424,439 | 1/1969 | Baker | 259/4 |
| 3,434,805 | 3/1969 | Bar | 259/4 |
| 3,554,714 | 1/1971 | Johnson | 259/4 |

*Primary Examiner*—Robert W. Jenkins
*Attorney*—Burgess, Dinklage & Sprung

[57] ABSTRACT

For supplying a foamable mixture for the production of foam material with fillers, these fillers are packed in a flexible tube. This packed tube is conveyed to the mixing chamber in form of an endless rod and the tube is removed just before the fillers are introduced into the mixing chamber.

10 Claims, 1 Drawing Figure

PATENTED FEB. 1 1972
3,638,915
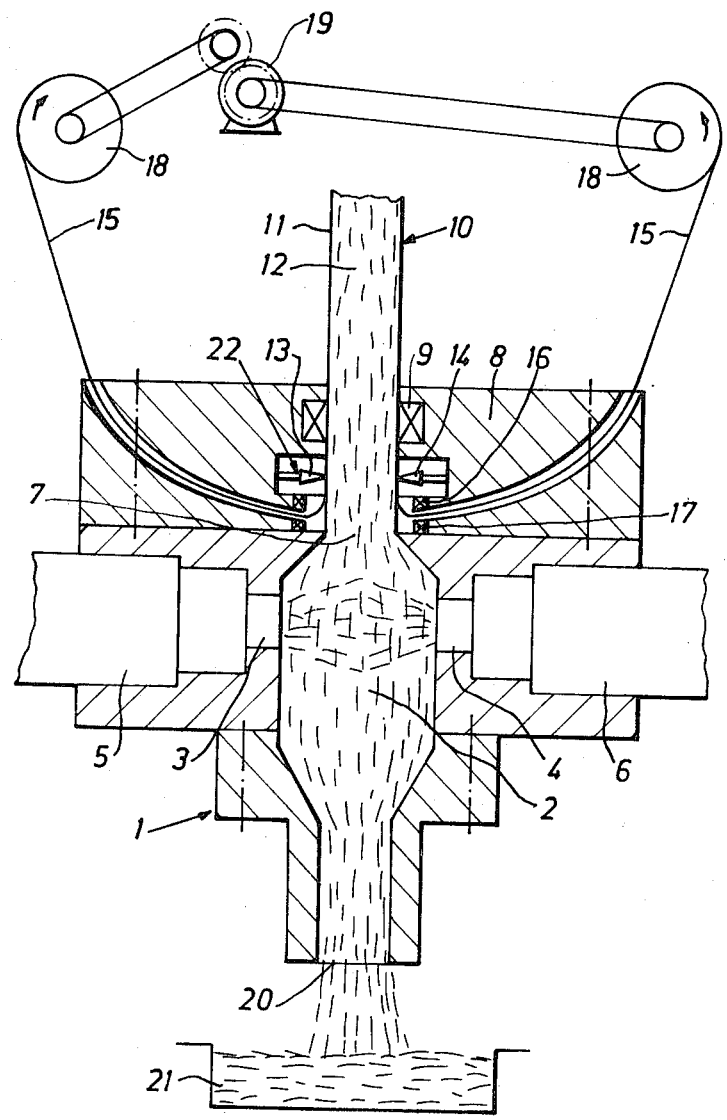
INVENTORS:
KARL BREER, UDO LAUTERBACH.
BY
Burgan, Dinklage & Sprung

APPARATUS FOR INTRODUCING SUBSTANCES INTO A FOAMABLE MIXTURE FOR FORMING A FOAM MATERIAL

The present invention relates to a process and an apparatus for the introduction of additional materials into a foamable and flowable mixture so as to form a foam material which is produced in a mixing chamber. Such a mixing chamber is formed in known manner with inlet openings for the reactants and the additives and with an outlet opening for the prepared mixture.

In the production of foam materials, for example polyurethane, polyamide and polyester foam materials, and the like, it is often necessary to incorporate reinforcing materials, for example glass fibers, carbon fibers, or even to incorporate lower grade materials, which are so-called fillers, e.g., old foam material, expanded clay, etc.

Such additives should be distributed as uniformly as possible in the finished foam material, in order to impart the required properties to the latter.

The measured introduction of the additives into the mixing chamber is extremely difficult, especially where abrasive or coarse-grain additives are involved. Because the mixing chamber is under pressure, the supply operation, which must be effected mechanically, can only be achieved with very great difficulty.

The present invention has for its object to provide a process and an apparatus which guarantee an exact and simple measured introduction of additives into a foamable mixture.

In accordance with the process of the invention, this is achieved according to the invention by the additives, packed in particulate form in a flexible tube, being fed as a continuous length into a mixing chamber, the tube being removed before the additives are introduced into the mixture.

The tube can, for example, be produced on an injection molding machine and can be simultaneously filled with additives. If the tube is wound into rolls, then a continuous length can be stored and handled in a particularly simple manner. The flexible tube is advantageously filled to such a degree that the tube wall exerts a pressure on the filling, so that the material is not displaced inside the tube. This is advantageous at the time of introduction into the mixing chamber, because then always only such an amount of additives is introduced as is released from the tube.

The apparatus according to the invention for carrying the process into effect is characterized in that a device for guiding the continuous length of tube containing filler is provided outside the additive inlet opening and has a cutting arrangement associated therewith, and packings are arranged between the length-guiding device and additive inlet opening, between which packings the severed tubular foil can be extracted by means of an extractor device.

The purpose of the length-guiding device is to guide the length of tube centrally into the inlet opening. The said guiding device is advantageously provided with a packing ring, which encloses the said continuous length. The moving tube is slit by the associated cutter arrangement at least at one position. The cut tubular foil is taken away by means of the extractor device between the packings arranged around the inlet opening and on that side of the guiding device which faces the inlet opening. The cutter arrangement advantageously has at least two knives, which are arranged facing one another. By tHis means, it is ensured that the contents of the tube are uniformly released.

As an alternative to the mechanically operating knives, the cutter arrangement consists according to the invention of an incandescent wire arrangement. This is particularly advantageous when the additives have abrasive properties, for in such a case, if knives were used, the cutting edges thereof would very soon become blunt.

According to one particularly advantageous embodiment of the invention, the extractor device is provided with a drive means of adjustable speed. In this way, the quantity of additives to be supplied per unit of mixture can be freely adjusted without having to use material lengths of different diameter or a different degree of filling. This very substantially simplifies the storage problems.

One embodiment of the apparatus according to the invention is now shown by way of example in the drawing and the process is more fully explained by reference thereto.

Arranged in a mixing head 1 is a mixing chamber 2, into which inlet openings 3 and 4 open for the foam-forming components supplied by nozzles 5 and 6. An inlet opening 7 serves for the introduction of the additives. Arranged above the inlet opening 7 is a guiding device comprising a body number 8 for a continuous length of material 10, which is enclosed by a packing ring 9. The said continuous length consists of a flexible tube 11 and additives 12 which are contained therein and which are to be introduced into the foamable mixture. Arranged beneath the packing ring 9 is a cutter arrangement 22, two knives 13 and 14 of which slit the tube 11. The severed tubular foil is extracted in the form of strips 15 between packings 16 and 17 by means of an extractor device 18. For the purpose of better illustration, the cutter arrangement 12 and extractor device 18 are shown offset by 90° relative to one another. The extractor device 18 is equipped with a drive means 19, the speed of which is steplessly variable, said drive means enabling the speed of extraction or withdrawal to be adapted to the quantity of additives to be supplied per unit of time. By variation of the extraction speed, it is possible to adjust any desired ratio between the quantities of mixture and additives. The foamable mixture, provided with additives, leaves the mixing chamber 2 through the outlet opening 20 and is introduced into a foaming mold 21.

We claim:

1. Apparatus suitable for adding solid filling materials to a liquid mixture of foam-forming components comprising a mixing head with inlet openings for the foam-forming components, an inlet opening for the filling material and an outlet opening for the foamable mixture containing the filling material, guiding means to move a flexible tube with said filling material contained therein to adjacent the inlet opening for the filling material for introduction of the filling material thereinto, and means for removing the tube from the filling material before reaching the inlet opening for the filling material for introduction of the filling material separated from the tube into the mixing chamber.

2. Apparatus according to claim 1, said removing means comprising cutting means for cutting the tube in an axial direction into at least two separate foils and takeup means to withdraw the foils.

3. Apparatus according to claim 2, the cutting means comprising at least one pair of knives, the knives facing each other and being arranged in a fixed position.

4. Apparatus according to claim 2, the cutting means comprising an incandescent filament.

5. Apparatus according to claim 2, wherein the takeup means are driven at an adjustable speed.

6. Apparatus according to claim 1, and including said tube containing filling material disposed in said guiding means.

7. Apparatus according to claim 1, said guiding means comprising a body member having an opening therein for passage of the tube therethrough to the inlet opening for the filling material, said removal means comprising a cutting means for cutting the tube in an axial direction into at least two separate foils, said cutting means being mounted in the body member, said removing means further including a passageway for each of said foils disposed in said body member, communicating with the body member opening intermediate the cutting means and the inlet opening for filling material, for receiving the foils and guiding them away from the body member opening.

8. Apparatus according to claim 7, and takeup means for withdrawing the foils from said passageways.

9. Apparatus according to claim 8, and packing means in each of said passageways for sealing the body member opening.

10. Apparatus according to claim 9, and packing means in said body member for forming a seal between the flexible tube and the body member opening before the tube reaches the cutting means.

* * * * *